June 30, 1942. E. S. MASON 2,288,099
CONTINUOUS METERING CONVEYER FOR BULK MATERIAL
Filed Oct. 18, 1939 3 Sheets-Sheet 1
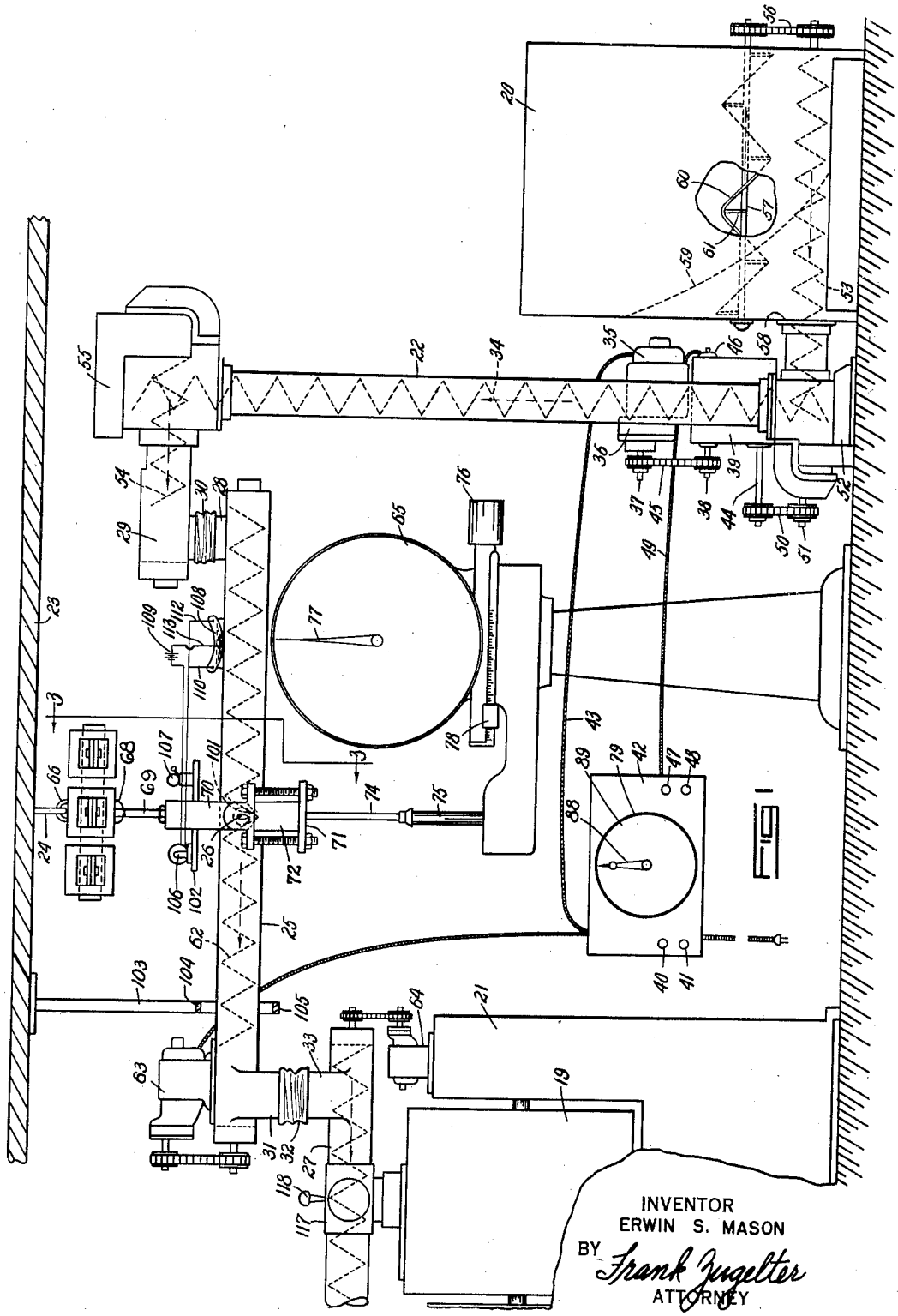
INVENTOR
ERWIN S. MASON
BY Frank Zugelter
ATTORNEY June 30, 1942.  E. S. MASON  2,288,099
CONTINUOUS METERING CONVEYER FOR BULK MATERIAL
Filed Oct. 18, 1939   3 Sheets-Sheet 2
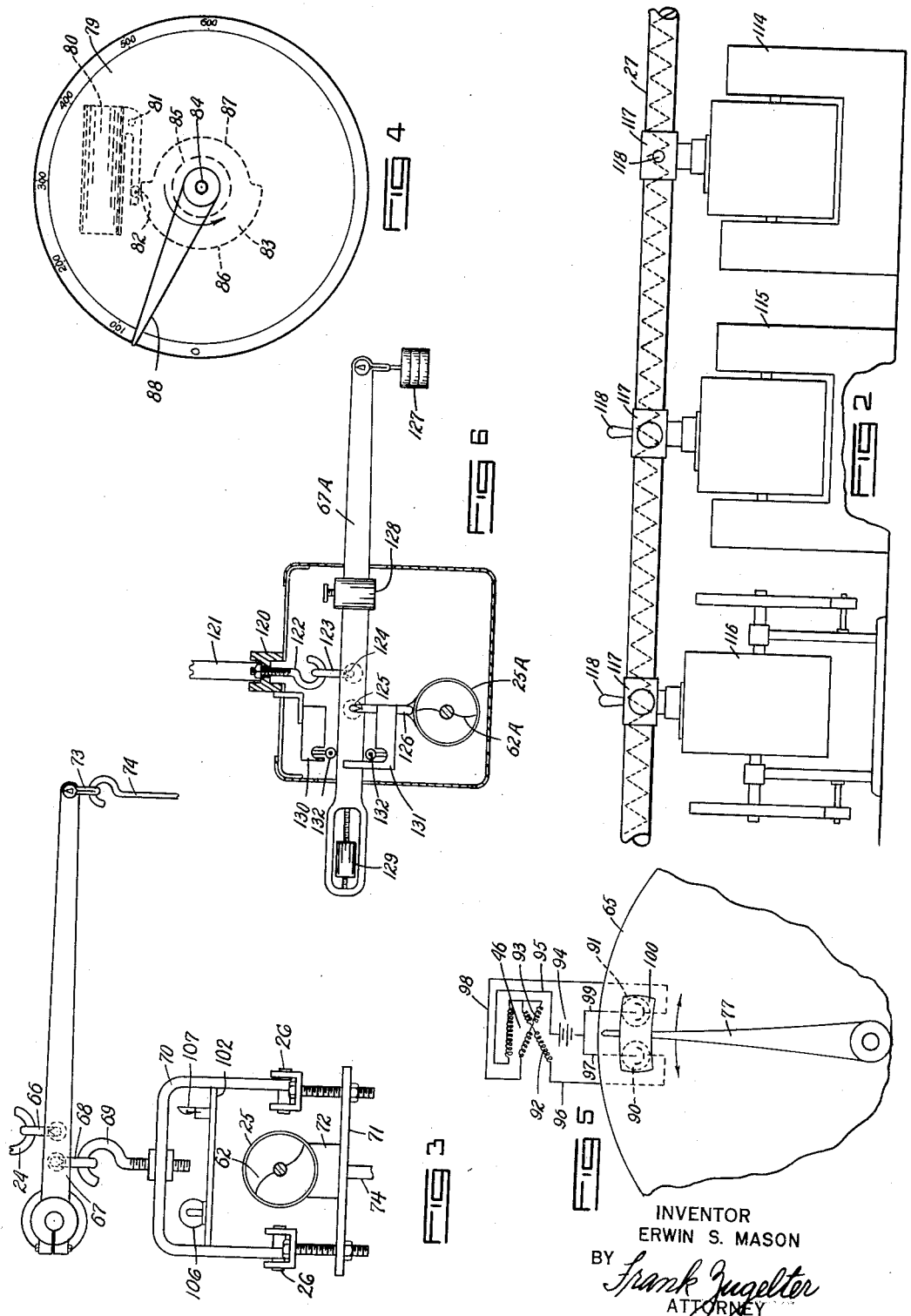
INVENTOR
ERWIN S. MASON
BY Frank Zugelter
ATTORNEY June 30, 1942.  E. S. MASON  2,288,099
CONTINUOUS METERING CONVEYER FOR BULK MATERIAL
Filed Oct. 18, 1939  3 Sheets-Sheet 3
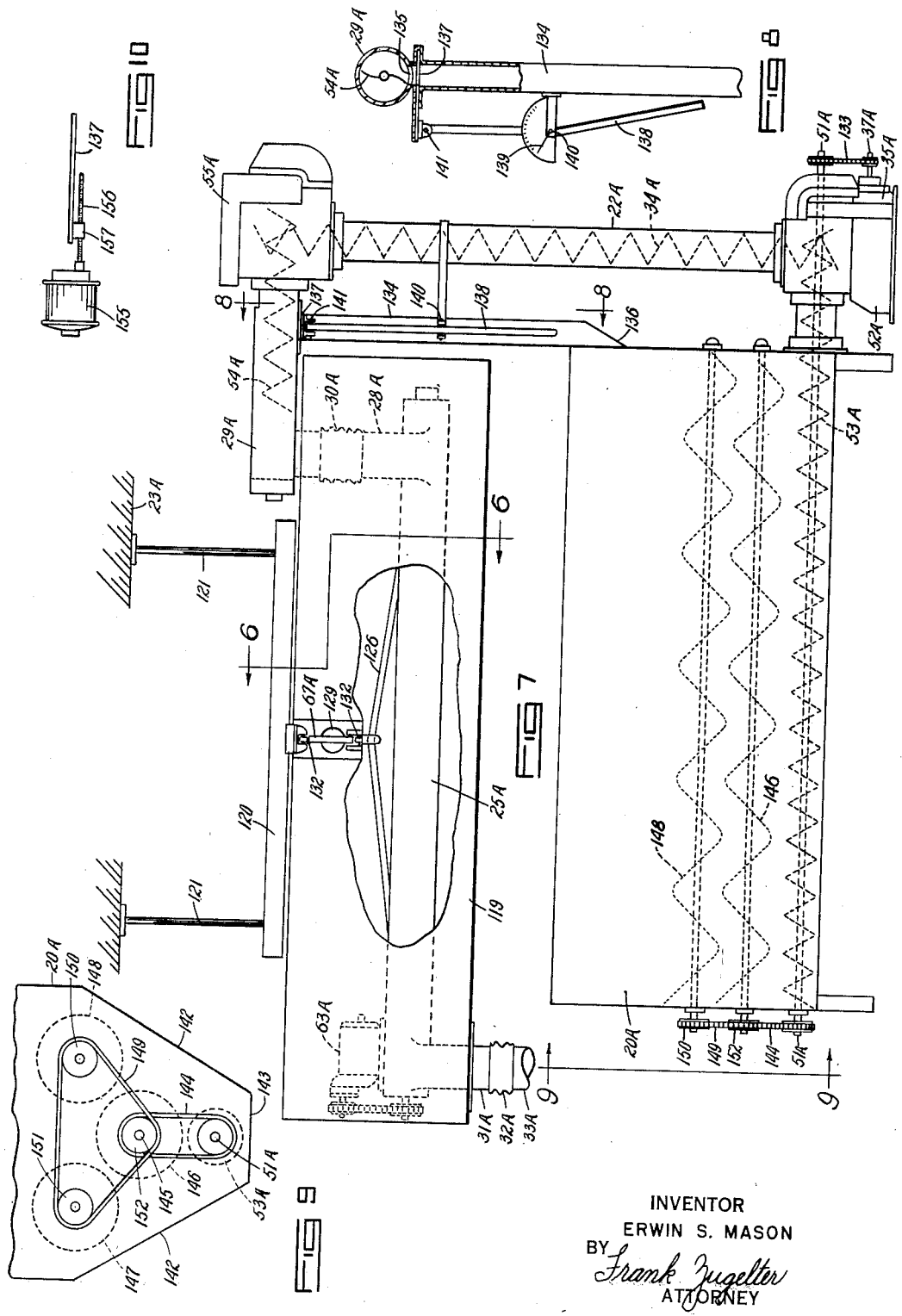
INVENTOR
ERWIN S. MASON
BY Frank Zugelter
ATTORNEY Patented June 30, 1942

2,288,099

UNITED STATES PATENT OFFICE 2,288,099

CONTINUOUS METERING CONVEYER FOR BULK MATERIAL

Erwin S. Mason, Norwood, Ohio, assignor to The J. H. Day Company, Cincinnati, Ohio, a corporation of Ohio Application October 18, 1939, Serial No. 300,049

18 Claims. (Cl. 198—39)

This invention relates to a conveyer and more particularly to one which includes means for weighing or metering continuously and without interruption, a material being conveyed, while enroute through the conveyer.

While the invention about to be disclosed and explained herein is adaptable to various arts and usages, it will be explained herein in connection with the baking industry, by way of example.

Heretofore, in the baking industry, it has been common practice to utilize one or more dough mixers, and to provide for each mixer a hopper in which flour is accumulated and weighed before dumping same into the mixer. Such hoppers are positioned above the mixers, and in some instances are mounted upon them. In other instances, a single hopper is arranged to supply a plurality of mixers. This is sometimes accomplished by using a tractionally mounted or positioned weighing hopper which is movable over a series of mixers so that any mixer could be charged from the same hopper. In all such variant forms of equipment, the buildings provided for such equipment were necessarily designed especially to accommodate same, and it is common to provide space above a mixer that is equivalent to an ordinary two story building.

An object of the invention is to eliminate the need for such special building construction, without in any manner impairing or affecting the efficiency or speed with which one or more mixers may be charged with measured or metered quantities of flour.

Another object of the invention is to provide means for conveying and weighing flour or the like from a storage bin to a mixing machine or the like and which storage bin and mixing machine are located and disposed within the limits of an ordinary story of a building.

A further object of the invention is to provide automatic conveying and weighing means for charging mixing machines or receptacles from suitable storage bins located on any floor level, including means for eliminating the need for a specially constructed building as above mentioned, so that the equipment will accommodate itself to existing limitations of space and ceiling height often encountered when installations are made.

Still a further object of the invention is to provide novel means for automatically delivering predetermined substantially uniformly metered quantities of bulk material from a large or unlimited source or supply thereof.

In this regard, it must be remembered that substances, such as flour, may vary in density, for various reasons, wherefore it is necessary to assure substantially uniform weight of batches of flour that are delivered to dough mixers, because in the mixing of dough, the various substances that enter into the dough are generally weighed or otherwise metered, so as to obtain generally uniform results. It is to be understood that in metering or weighing flour preparatory to mixing a batch of dough, a slight variation of one or two pounds of flour in a large batch of dough is not a serious factor. It has been found that a device conforming with the disclosure herein does measure, meter or weigh large masses of flour with greater accuracy than is ordinarily required in the baking art.

Another object is to provide a storage bin with means for effectually precluding segregation or isolation of portions of the bin contents, which portions if permitted to accumulate, might become moldy or otherwise unfit for use.

Still a further object of the invention is to provide a device of the hereinabove described character which may be inexpensively and easily constructed and maintained in service.

These and other objects are attained by the means described herein and disclosed in the accompanying drawings, in which:

Fig. 1 is an elevational view of a typical installation embodying the present invention, with manual elevator control.

Fig. 2 is an elevational view of a typical installation of mixers such as might normally be disposed to the left of the installation disclosed in Fig. 1.

Fig. 3 is a vertical cross-sectional view taken on line 3—3 of Fig. 1.

Fig. 4 is a front plan view of a portion of a timer which comprises a detail of the present invention.

Fig. 5 is a fragmental elevational view of an automatic elevator control with which the structure of Fig. 1 may be equipped.

Fig. 6 is a cross-sectional view taken on line 6—6 of Fig. 7, which illustrates a modified form of the apparatus.

Fig. 7 is an elevational view, corresponding to that of Fig. 1, showing the modified form of apparatus mentioned in the next preceding paragraph.

Fig. 8 is a fragmental cross-sectional view taken on line 8—8 of Fig. 7, part being broken away in the interest of clarity of disclosure.

Fig. 9 is an end elevational view taken on line 9—9 of Fig. 7, showing a driving arrangement for a novel bulk-material moving apparatus of the invention.

Fig. 10 illustrates a power-actuated valve, in elevation.

At the outset it should be understood that the combination weighing and conveying device comprising the present invention is primarily adapted to continuously weigh or meter bulk material while en route through the conveyer. The device is adapted to handle all kinds and types of bulk materials, ranging from finely ground or powdered substances such as flour or the like, to larger bulk substances such as lump coal and the like. However, by way of example and for the purpose of illustration only, the present invention will describe a conveying-metering device such as would be suitable for use in a modern bakery, for conveying metering quantities of flour, or other bulk material from a storage bin directly to one or more mixing machines.

In that form of the invention which is illustrated by Fig. 1, a representative bakery installation may comprise a flour storage bin 20 and a processing machine or mixer 21 including a tank or receptacle 19. Flour from the bin is transferred to the tank of mixer 21, or to the tanks of a series of other mixers as will be hereinafter explained, through the medium of a flour elevator 22 and a weighing or metering apparatus which by preference is suspended from an overhead support or ceiling 23 by means of a hook or the like 24. In general, the weighing or metering means comprises a horizontal screw conveyer tube or housing 25 which is so freely suspended from the weighing apparatus as to be capable of bodily movement in a vertical plane, and also tilting movement about a fulcrum 26. Because of the moving characteristic of the horizontal conveyer 25 its connections to the elevator and to the conveyer 27 leading to the mixers, are appropriately made flexible. That is, the inlet port 28 of the weighing conveyer 25 is connected with the terminal end 29 of elevator 22 preferably by means of a flexible connecter 30 made of fabric or the like, and the discharge port 31 is connected by means of a similar flexible connecter 32 to the upstanding entry port 33 of conveyer 27. The primary function of the flexible connecters 30 and 32 is to preclude escape of flour dust incident to movement of flour from the elevator 22 to a tank such as 19.

The flour elevator 22 may be of conventional design, especially as to its principal parts. Thus, said elevator comprises an elevating screw 34, and means for power rotating the screw. The elevator may be distinguished from other elevators in that it is provided with a variable speed drive whereby the elevating rate and the rate of discharge may be controlled either manually or automatically. By way of example, the drive may comprise a constant speed electric motor 35 including a gear reduction box 36, the shaft 37 of which drives the shaft 38 of a change speed device 39. The starting and stopping of the motor may be controlled by means of electrical switches 40 and 41 mounted upon a control panel 42, from which panel a wiring conduit 43 leads to the motor.

The change speed device may be of any conventional type, an excellent example of which is disclosed in the patent of W. R. Perry #1,757,734 dated May 6, 1930. The motor 6 of the patent corresponds to the motor 35 herein, and the driven shaft 9 of the patent corresponds to the driven shaft 44 of the accompanying drawing. That is to say, the shaft 38 herein is rotated at a constant speed by the power transmission chain 45, whereas the rate of rotation of shaft 44 may be varied by adjusting the speed ratio of the change speed device 39. In the patent mentioned, the change of speed is effected by rotating a right and left thread screw in oppoiste directions, this being likewise accomplished in the applicant's arrangement, by the use of a small reversible control motor 46. The direction of rotation of the control motor 46 may be manually determined by actuating the spring returned forward or reverse push buttons 47 and 48 on the control panel 42. A wiring conduit 49 carries the electric conductors leading from the buttons 47 and 48 to the control motor 46. From the foregoing it should be understood that control motor 46 may be rotated in one direction as long as the button 47 is kept depressed, and that a reversal of the motor results from depressing the other button 48. When neither button is depressed, the motor 46 is deenergized.

A driving chain 50 transmits the variable rotation of shaft 44 to a shaft 51 which, through suitable gearing contained in the base 52 of the elevating screw conveyer, drives the screws 34 and 53. A delivery screw 54 at the top of the elevator may be driven from the screw 34 by means of gearing within the housing 55.

All of the preceding description pertaining to the flour elevator is intended to impress the reader with the fact that the elevator shall be capable of receiving flour from the bin 20 and discharging the flour from the delivery end 29 of the elevator, at varying rates of discharge to be determined and controlled by the machine operator. The operator, using the means provided on the control board 42, may also start and stop the apparatus. It should be here stated that the driving motor 35 will preferably be equipped with a magnetic brake, so that starting and stopping thereof will be substantially instantaneous.

The screw 53 which is adapted to move flour toward the lower end of the elevator, in the direction of the arrow, may have at its outer end a suitable chain and sprocket arrangement 56 for rotating an auxiliary screw or agitator 57, for the purpose described below.

It has been noted that when bulk material such as flour is removed from the lower portion of the storage bin by means of a screw such as 53, the screw tends to draw the material from that portion of the bin which is remote from the bin discharge port 58. Accordingly, the contents of the bin eventually will assume the general outline of form indicated by the broken line 59. In the absence of means for agitating or dislodging the material in the lower left portion of the storage bin, it will remain there even though a new supply of bulk material be added to the contents of bin 20. It will readily be evident, therefore, that if a perishable bulb material such as flour be permitted to become isolated within the bin for any appreciable time it may soon become moldy or otherwise unfit for use. In order to prevent such an accumulation, the auxiliary screw 57 of large diameter, and preferably of coarse pitch, may be provided parallel to and above the conveyer screw 53, as illustrated. The lead of screw 57 should be such as to move or shift the flour in a direction counter to the direction of delivery of screw 53, that is to the right and away from discharge port 58. Said auxiliary screw may comprise a band or narrow strip 60 of iron or like material spiraled about the shaft 57 and supported by means of suitable arms or struts 61.

The rate with which the auxiliary screw 60 shifts or distributes the material relative to the screw 53 need not be equal to the rate at which screw 53 discharges the material through the part 58, since the function of the auxiliary screw is merely to preclude the formation of isolated areas in the bulb material within the bin.

The foregoing explanation completes the description of the mechanism shown at the extreme right of Fig. 1.

Reference is now made to the weighing or metering apparatus including the weighing conveyer 25, which is shown located between the elevator 22 and the mixer 21. The screw 62 of weighing conveyer 25 may be separately driven by means of a motor 63 mounted upon the conveyer. Flour moved by this screw falls through the discharge port 31 and is advanced toward one or more mixers by the distributing conveyer 27, the latter being preferably driven by a separate motor 64, as indicated.

The theory upon which the present device functions is based upon the fact that the quantity of material delivered to distributing conveyer 27 is directly proportional to the rate at which the material is conveyed through the horizontal weighing conveyer 25. Or, stated in a different way, the total quantity of material delivered to distributing conveyer 27 is directly proportional to the weight of material moved through the horizontal weighing conveyer 25 in one second, multiplied by the number of seconds required to deliver the total quantity of material desired.

In order to accurately control and determine the weight of material being moved through horizontal conveyer 25 at any instant, a weighing machine, such as scale 65 may be utilized. In that embodiment of the invention disclosed in Figs. 1 to 3, horizontal conveyer 25 may be suspended from the ceiling or other load sustaining superstructure by means of hook 24, clevis 66, balance arm 67, clevis 68, beam hook 69, bracket 70 and base plate 71. Weighing conveyor 25 may be appropriately secured to base plate 71 by means of spaced upstanding blocks 72 as clearly shown in Fig. 3. The load on clevis 68 may be transmitted to scale 65 through balance arm 67, clevis 73 and rod 74, to the upstanding load bar 75 of scale 65, as shown.

If desired, a counterweight 76 may be provided to counterbalance the weight of horizontal conveyer 25, motor 63, and of other apparatus that may be mounted on said horizontal conveyer. By properly adjusting said counterweight, the scale indicator hand or pointer 77 may be caused to point to zero during those periods of time when said conveyer is empty.

It should be observed that by reason of the fact that the indicator points to zero when the conveyer 25 is empty, the total weight of any bulk material contained within said conveyer 25 at any instant will be indicated on the face of scale 65, directly in pounds. It should be observed further, that for a given speed or operation of the elevator 22 and its conveyers 53 and 54, and for a given speed of operation of weighing conveyer 25, assuming that the bulk material being conveyed is of uniform density, that the weight of material passing through conveyer 25 per unit of time will be constant, and the rate of discharge from said conveyer will also be constant. During such periods of constant or uniform discharge, the indicator 77 will point steadily to the figure on scale 65 which corresponds to the weight of the bulk material housed within the weighing conveyer 25. If desired, a suitable counterweight 78 may be provided to counter-balance the weight of the bulk material thus normally housed within horizontal conveyer 25.

By properly adjusting counterweight 78 so as to cause indicator 77 to point to zero when the desired weight of bulk material is contained within the weighing conveyer, any variation in weight of the bulk material passing through said conveyer will be instantly indicated by the indicator 77 being biased from its zero setting. However, so long as the weight of material being conveyed through said weighing conveyer is constant and proper in amount, the indicator will point steadily to zero. Therefore, if the weight of material within conveyer 26 is uniform or constant, a substantially definite predictable weight of material will be discharged from said conveyer over a given period of time for a given speed of rotation of said conveyer.

By way of example, it may be assumed that for a given speed of operation of the weighing conveyer 25 three pounds of material per second will be emptied through discharge port 31. Therefore, if three hundred pounds of material be required, by way of example, to charge a mixer 21, the weighing conveyer 26 and the elevator would be operated for 100 seconds. If at the expiration of 100 seconds the drive motors 35 and 63 be instantly stopped, 300 pounds of material will have been metered out to mixer 21.

In order to accurately control the operating periods of drive motors 35 and 63, a time responsive switch or timer unit such as 79 may be provided for the purpose of breaking the electrical circuits to said motors after a preselected period of time has elapsed.

Such a timer unit may comprise a suitable tiltable mercury switch 80 (Fig. 4), which may be connected in series with the electrical circuit of each drive motor 35 and 63. If desired, switch 80 may be mounted upon a fixed pivot 81, and may be provided with a cam follower 82 adapted to contact the outer periphery of a rotatable cam 83. Said cam may be fixed to a cam shaft 84 which in turn is adapted to be rotated at a uniform speed, preferably by means of a synchronous motor 85. Whenever the cam follower 82 is riding upon the toe 86 of the cam, mercury switch 80 will be disposed in a substantially horizontal position, for closing the electrical circuits of motors 35 and 63. When cam 83 has been rotated so that follower 82 contacts the heel 87 of the cam, the mercury switch will be tilted, and the circuits to motors 35 and 63 will be opened. The wiring for this is obviously elementary, and need not therefore be detailed.

In order to enable an operator to accurately set the timer for a certain operating period, a pointer such as 88 may be provided. Said pointer may be adapted for movement over a calibrated dial 89 and may be secured to timer shaft 84 whereby shaft 84, cam 83 and pointer 88 are adapted to rotate together as a unit. The drive from motor 85 to shaft 84 should not be positive, but should instead be effected through a friction clutch, not shown, in order that the pointer may be set by hand, without rotation of the motor.

To explain the operation and use of the timer, let it be assumed that in the timer disclosed in Fig. 4, the cam shaft 84 is so geared to the synchronous motor 85 as to rotate 180° in two hundred seconds. Therefore, assuming that three pounds of bulk material per second are discharged from the weighing conveyer 25, then six hundred pounds of material would be discharged from said conveyer during the two hundred seconds required for shaft 84 to rotate 180 degrees. If desired, dial face 89 may be calibrated directly in pounds so that the output of the device may be easily preselected by merely turning the pointer 88 to register with a desired poundage figure on dial 89. After setting the pointer to indicate an amount of flour to be fed to the mixer 21, the apparatus may be started by depressing the start button 40, whereupon flour will be delivered from bin 20 until the timer operates to break the motor circuits through the tilting switch 80. The mixer will then have been charged with the amount of flour preselected.

In actual practice, the weight of flour delivered to weighing conveyer 25 by elevator 22 varies slightly from time to time due to many factors such as different densities of the material, variations in the percentage of moisture in the material, and other recognized variable factors. Since in the example given, the output of the weighing conveyer 25 is based upon a discharge rate of three pounds per second, it becomes apparent that the rate of discharge will be exact and constant only so long as a definite weight of material is maintained within the weighing conveyer 25 because the speed of operation of said conveyer is assumed to be constant. Therefore it becomes imperative to maintain a definite and constant weight of material in said conveyer at all times, as evidenced by indicator hand 77 pointing to zero. Whenever an improper weight of material is delivered to the weighing conveyer 25, indicator 77 will be biased to one side or the other of the zero mark thereby indicating that the contents of said conveyer are too heavy or too light to maintain the discharge rate of three pounds per second.

This condition may be remedied by controlling the rate at which the material is being delivered to the weighing conveyer 25. The rate of delivery of material to the weighing conveyer may be varied by operating the conveyers 53 and 54 and the elevator 22 at different speeds, through the medium of the speed changer 39 as heretofore explained. As soon as the rate of delivery has been adjusted so as to satisfy the requirements of the weighing conveyer 25, as evidenced by the indicator hand again pointing to zero, further adjustments are discontinued and the apparatus will deliver flour to the mixer at a known rate and for a predetermined time period, whereby to charge the mixer with a definite amount. The weighing of the flour is therefore seen to be a continuing process, saving much time and handling in the charging of mixers.

In some instances it may be advantageous to provide automatic means for closing one or the other of the circuits to the control motor 46 in the event that the weight of material in the weighing conveyer 25 should vary and thereby bias the indicator 77 from the zero point. Such means will hereafter be referred to as an automatic elevator control, to distinguish from the button, or manual elevator control just described.

As disclosed in Fig. 5, one type of such automatic elevator control means may comprise a pair of photoelectric cells 90 and 91 located at opposite sides of the zero point of dial 65. Photoelectric cell 90 may be in series with the reversing coil 92 of motor 46, and photoelectric cell 91 may be in series with the forward drive coil 93 of said motor. A suitable source of electrical energy 94 may be connected to one side of motor 46 by way of conductor 95, the electrical circuit being completed through reversing coil 92, conductor 96, photoelectric cell 90 and conductor 97, back to the source 94, or through forward drive coil 93, conductor 98, photoelectric cell 91 and conductor 99 back to the other side of the source of electrical energy.

A target or shield 100 may be fixedly mounted upon indicator hand 77 in such a manner as to prevent a beam of light, (not shown) from falling upon and energizing either of the photoelectric cells during those periods of time when indicator 77 registers with the zero mark of the scale 65.

In the event that the contents of horizontal conveyer 25 should vary in weight, indicator 77 will be biased or deflected to one side or the other of the zero mark so as to uncover or expose one or the other of the photoelectric cells. An exciting beam from a suitable source of light, not shown, then would be permitted to fall on the cell so exposed, to complete the electrical circuit to its associated drive coil of motor 46. The motor accordingly will be energized so as to alter the speed of rotation of the terminal shaft 44 of the change speed unit 39, for either increasing or decreasing the delivery rate of the elevator, depending upon whether the weighing conveyer is running light or heavy. When the proper weight of material is once again reestablished in horizontal conveyer 25, at which time indicator 77 will return to its zero point, the beam of light will be interrupted by target 100, whereupon the photoelectric cell will be deenergized and the circuit to motor 46 automatically opened.

It should be understood that in some instances the photoelectric cells may be utilized to operate suitable electrical relays, not shown, which in turn will selectively close the electrical circuits to motor drive coils 92 and 93.

In some instances it may be desirable to mount the weighing conveyer 25 in such a manner as to permit it to be balanced about a fulcrum disposed at a point midway of its length, as shown in Fig. 1. Such a fulcrum may comprise suitable knife edge pivots 26 mounted in a bearing 101 of the bracket 102, as clearly shown in Fig. 1. Suitable counterweights, if necessary, may be provided on the right end of horizontal conveyer 25 to counter-balance the weight of motor 63.

In order to limit the amount or degree of vertical movement of the ends of conveyer 25 about pivots 101 during those periods of time when the load within said conveyer may fluctuate or be unevenly distributed throughout its length, a bracket member such as 103 may be provided. Said bracket may comprise upper and lower stops 104 and 105 adapted to engage the upper and lower surfaces of conveyer 25, respectively. Said bracket may be suspended from the ceiling or superstructure 23, as shown.

Conveyer 25 is adapted to normally assume a balanced horizontal position so long as a constant and uniform weight of material is disposed throughout its length. Therefore, the moment the rate of delivery of material to said conveyer varies from the delivery rate necessary to maintain a normal desired discharge rate, the conveyer will be unbalanced and will be tilted about fulcrum 26. To warn the operator or attendant of such a change of conditions, suitable audible and/or visible signal means may be provided.

A representative form of audible and visible signal means may comprise a suitable electric lamp 106 and an electric bell 107, each of which conveniently may be secured to a shelf or bracket 102, if desired. A suitable switch such as a double acting mercury switch 108 may be mounted on weighing conveyer 25, and an electrical circuit from any appropriate source of electrical energy 109 may be simultaneously completed to lamp 106 and bell 107 through conductors 110 and 112, one or the other of which is adapted to be electrically connected to conductor 113 through the mercury pool of the switch as said pool is shifted to one end or the other, when conveyer 25 is tilted or unbalanced. Upon observing the signals, and noting the direction of tilt of the conveyer, an attendant may adjust the rate of delivery of material from the bin to said conveyer by manipulating the buttons 47 and 48 as previously explained.

The bulk material, after being metered through the weighing conveyer 25, will be discharged into the intake 33 of distributing conveyer 27, as clearly shown in Fig. 1. As shown in Fig. 2 distributing conveyer 27 may extend over several mixers such as 114, 115 and 116, in addition to mixer 21 which, in the installation shown, is disposed to the right of mixer 114. Suitable discharge gates or valves 117, to be opened and closed by means of handles 118 or otherwise, may be provided at spaced intervals in the distributing conveyer 27, above a charge port of each mixer as shown.

In the illustration of Fig. 2, the discharge valve for mixer 114 is in an open position while all other discharge valves are closed. Therefore material weighed out from conveyer 25 will be carried by distributing conveyer 27 past the closed valve of mixer 21, to the open discharge valve of mixer 114. Accordingly, all of the material advanced in conveyer 27 will be discharged into mixer 114.

It should here be noted that under normal conditions flour will always be contained in the system. Whenever a mixer is to be charged, the flour requirement, in pounds, may be set on timer 79 by manipulating the pointer 88 as hereinabove explained. All of the discharge valves in the distributing conveyer 27 are to be closed, except the discharge valve for the particular mixer to be charged with flour. With the distributing conveyer 27 in operation, the actual delivery of flour thereto will start the moment the master starting button 47 is pushed, which simultaneously closes the circuits to motors 35, 63 and the synchronous timing motor 85.

Flour will be delivered to distributing conveyer 27 at the required rate for the duration of the timing period. Upon the expiration of the timing period, motors 35 and 63 and the synchronous timing motor will be instantly stopped thereby terminating the delivery of flour to distributing conveyer 27.

It should be understood that the system hereinabove disclosed may be adapted to meter many types and kinds of bulk material other than flour without departing from the spirit of the invention. The terms conveyer and elevator as used throughout this application are used broadly and are meant to include a pipe-like structure or housing in which is enclosed a suitable single or double plate helix formed about a suitable driving shaft.

For handling certain types of bulk materials, it may be desirable to substitute suitable band or belt conveyers for the screw conveyers shown in the drawings. By substituting a horizontal belt conveyer for horizontal screw conveyer 62, the weighing and timing means hereinabove disclosed may be used without change, whereby the flexibility of the device becomes apparent.

The device of Figs. 6, 7, 8 and 9:

In that form of the invention illustrated by Figs. 6, 7, 8 and 9, it will be noted that a number of the same elements which constitute the apparatus already described are utilized. In the interests of clarity and convenience, therefore, the major elements which correspond in the two forms of the apparatus, will have the same reference characters except for the addition of the identifying suffix "A" in the second form of the invention. For example, the weighing conveyer 25 of Figs. 1 to 5, will be identified as weighing conveyer 25A in Figs. 6 to 9, and motor 63 of Figs. 1 to 5 will be motor 63A in Figs. 6 to 9, etc.

With reference to Figs. 6 and 7, it will be observed that the weighing conveyer 25A may be encased within an appropriate protective housing 119. The housing conveniently may be fixed to any suitable support such as an H-beam 120, which may in turn be suspended by means of a bar or the like 121 from a superstructure 23A. The opposite ends of the weighing conveyer are adapted to be connected to the extension 29A of elevator 22A by means of a flexible coupling member 30A, and to mixer charging conveyer intake 33A by means of a second flexible coupling member 32A as in the first form of the invention previously described. The screw 62A of the weighing conveyer may be power rotated by means of the motor 63A.

The weighing apparatus for the second form of the invention includes various distinctions over the weighing apparatus heretofore described. With reference to Fig. 6, it will be evident that the beam 67A is suspended from the overhead support by means of a hook 122, for example, through the agency of a clevis 123 carrying a fulcrum 124 for the beam. To the left of the fulcrum 124 there is provided a second fulcrum 125 which carries the weight of weighing conveyer 25A through the medium of a truss or the like 126 whose opposite ends are anchored to the housing of the weighing conveyer. To the right of the fulcurm 124, the scale beam carries a fixed counterbalance 127 and a shiftable counterbalance 128, for counterbalancing the weight of the weighing conveyer and its contents. If desired, a finely adjustable weight 129 may be furnished in order to secure a high degree of accuracy of the balance.

The characters 130 and 131 indicate conventionally a pair of electrical switches located above and below the balance arm, each carrying a reciprocable switch actuator 132 adapted for opening and closing the switches upon movement of the balance arm to a tilted position in either direction about the fulcrum 124. These switches may be wired to audible and/or visible signal means as explained in connection with the switch 108 of Fig. 1. If desired, the switches 130 and 131 may be wired in a manner suggested in the description of Fig. 5 pertaining to the first form of apparatus described, in order to automatically vary the output of a flour elevator feeding the weighing conveyer.

From the foregoing it should be evident that a constant and uniform feed of material to the weighing conveyer 25A by the screw 54A, will result in maintaining a balanced condition of the weighing apparatus disclosed in Fig. 6, so that the weighing conveyer will continuously discharge weighed or metered quantities of flour or other material to the inlet 33A of the charging conveyer that supplies the various mixers. Should the flour advanced by the elevator vary in density or moisture content, or should a variation occur by reason of any changing conditions in the operation of the elevator or its associated mechanism, the scale beam will be thrown out of balance and this will result in actuating one or the other of the electrical switches 130 and 131 to establish a signal indicating the unbalanced condition of the apparatus. The operator or attendant then may re-establish the balance by making necessary adjustments to be hereinafter explained.

Attention is directed to the fact that the need for utilizing a speed changer between the main driving motor 35 and the screws of the flour feed conveyer system, has been eliminated in the second form of the invention. In Fig. 7, the main driving motor 35A preferably will be of the constant speed type, and arranged in direct driving relationship with the shaft 51A of the bin feed screw 53A. The drive relationship may be effected by any suitable means, such as a chain and sprocket arrangement 133. The base 52A and the head 55A of the elevator may contain the necessary gearing for coordinating the drive of the various screws 53A, 34A and 54A, as in the first form of the invention.

As in the first form of the apparatus, means are provided for varying the rate at which flour is to be fed to the intake of the weighing conveyer. Such means, however, in the present form of apparatus may include a flour by-pass tube 134 having its upper end in communication with an aperture 135 of conveyer housing 29A, while its lower end 136 communicates with the flour bin or source of supply 20A. The amount of flour that may be by-passed through the tube 134 must be capable of variation in order to affect the rate of feed into the intake 28A of the weighing conveyer. For this purpose, any suitable type of valve may be provided in connection with the by-pass tube. In the embodiment illustrated, a horizontal reciprocable valve plate 137 is provided, and so arranged that the by-pass may be opened to a greater or lesser extent by the manipulating of a valve actuator 138. The actuator may be in the form of a handle, as shown, or it may assume other forms, as desired. An indicator 139 to sweep a suitable calibrated dial may be included in the arrangement, to indicate the various open positions of the valve. The characters 140 and 141 represent pivots in the valve arrangement. It may here be mentioned that the by-pass 137 may be motor actuated in an automatic manner, under the control of the switches 130 and 131 (Fig. 6), in substantially the manner explained in connection with motor 46 of Fig. 5. By way of example, see Fig. 10 in which the valve plate 137 may be rendered power-reciprocable by means of a reversible reduced-speed electric motor 155 for rotating the screw 156 in opposite directions through the nut 157 carried by the valve plate.

From the foregoing, it will be evident that an operator may regulate the amount of material fed to the weighing conveyer 25A, by effecting the necessary adjustments of valve 137, and without altering the speeds of the screws of the elevator assembly. It is noteworthy also that the weighing conveyer 25A, in the apparatus of Fig. 7, need not necessarily be capable of any tilting movement where it is suspended from the weighing apparatus.

Attention is now directed to the construction of the bin 20A. This bin may be constructed of sheet metal or the like, and will preferably include a bottom having sloping sides 142 in the vicinity of its bottom wall 143. The screw 53A, which is the screw driven directly from the motor 35A, preferably is located closely adjacent to and in parallelism with the bottom of the bin. From the shaft 51A of said screw, suitable power transmission means such as a system of chains and sprockets 144 may extend upwardly to the shaft 145 of a reverse screw or helix 146, the function of which is to agitate and keep in movement any flour that might have a tendency to become isolated at one end of the bin. It should be understood that the reverse screw 146 tends always to move the material in a direction opposite to that of the feed screw 53A. The screw 146 may be of the same construction as the screw indicated at 57 of Fig. 1, the nature and function of which was heretofore described in connection with the Fig. 1 device.

In addition to the screw or helix 146, a pair of agitator screws 147 and 148 may be located within the bin, if desired, to further ensure maintaining the bin contents in proper condition for acceptance by the main feed screw 53A of the bin. The screws 147 and 148 will preferably be rotated in a proper direction for moving the bin contents in the same direction as does screw 53A, this being accomplished by the use of any suitable means such as a belt or chain 149 passing over pulleys or sprockets 151 and 152. The rates of advancement of the several screws 146, 147, and 148 are not critical, but the directions of flour advancement effected thereby, as explained and indicated herein, are of primary importance in so far as the efficiency of the bin structure is concerned. While any acceptable bin structure which will maintain an adequate supply for the screw 53A may be used in conjunction with the flour elevator, the particular type of bin structure disclosed has been found very effective for continuously aerating, blending and leveling the flour to maintain the uniformity necessary for proper interrupted functioning of the elevator and weighing conveyer, while at the same time obviating dead spots or isolated regions in the bin.

It should be understood that the discharge port 31A of the weighing conveyer is adapted to feed either a single mixer, or a battery of mixers arranged as suggested in Fig. 2. The apparatus of Fig. 7 will continuously weigh and supply flour or other material to any number of mixers, or to any other type of machine or receptacle to be charged or supplied with known quantities of material.

From the foregoing it is apparent that I have provided compact and efficient means for conveying a predetermined continuously metered weight of bulk material from a storage bin to a distributing conveyer, in which the storage bin, when necessary or desirable, may be located on the same floor level with machines or devices to be charged. The various other objects and improvements characterizing the apparatus will be found mentioned in the objects at the head of this description, wherefore they need not here be repeated. It is to be understood that various modifications and changes may be made in the structural details of the apparatus, within the scope of the appended claims, without departing from the spirit of the invention.

What is claimed is:

1. The combination with a storage bin for bulk material and a distributing device, of a conveyer unit disposed between said storage bin and distributing device including means for weighing the material as it is conveyed to said distributing device, said weighing means comprising a horizontal conveyer including independent drive means, a weighing scale member, means pivotally suspending said horizontal conveyer, at substantially its center of gravity, from said scale member whereby to impart to the horizontal conveyer the characteristics of tiltability of its ends in opposite directions vertically, and full bodily suspension from the scale member, said horizontal conveyer having inlet and outlet ports disposed at opposite ends thereof, means extending between said storage bin and the inlet port of said horizontal conveyer for transferring the contents of said storage bin to said horizontal conveyer, said outlet port being in communication with said distributing device, the constancy of the weight of material being conveyed through said horizontal conveyer at any instant being indicated on said scale and means responsive to the tilting movements of the horizontal conveyer, for signalling the presence of inconsistencies in the feed of material advanced by the transferring means aforesaid.

2. In a conveyer device for bulk material, the combination of means for metering predetermined quantities of said material from said device, said means comprising a horizontal conveyer, means for operating said conveyer at a substantially uniform rate of speed, means for delivering a uniform weight of material to said conveyer, and timer means for controlling the operating periods of said last two mentioned means for stopping said device upon expiration of a predetermined operating time irrespective of the quantity of material delivered.

3. In a conveyer unit for bulk material, the combination of means for automatically delivering a predetermined weight of said material, said means comprising a horizontal conveyer, means for operating said conveyer at a constant rate, means for delivering the material to said conveyer, means for continuously weighing the material in said conveyer, and means for controlling the rate of delivery of the material to said conveyer for maintaining a constant weight of material in said conveyer, and timer means for controlling the operating time period of said conveyer and delivery means.

4. In a conveyer unit for automatically delivering a preselected weight of bulk material, the combination which comprises a horizontal conveyer, means for operating said conveyer at a uniform rate of speed, means for delivering material to said conveyer, means for maintaining a uniform weight of material in said horizontal conveyer so that the rate of discharge from said conveyer is constant, and timer means for controlling the operating time period of said unit, said timer means including adjustment means operable to preselect the quantity of material delivered each time the unit is operated.

5. A weighing device comprising in combination, a tiltable screw conveyer including a screw, and a housing therefor suspended for bodily vertical movement, at its center of gravity, from a lever of a scale so as to be normally in a substantially horizontal state of balance, charging means provided at one end of said conveyer and discharge means at the other end thereof providing for continuous passage of weighable material through the balanced housing, power means mounted bodily upon the housing to continuously rotate the screw therein, and signal means including operating means therefor, said operating means being mounted upon the screw housing to respond to tilting movements of said housing irrespective of the bodily vertical movements of the latter, for operating the signal means aforesaid when the housing tilts in response to inconsistencies in the feed of material advanced by the charging means.

6. A weighing device comprising in combination, a tiltable conveyer balanced normally in a substantially horizontal position from a lever of a scale, and movable bodily vertically with the movements of said scale lever, charging means at one end of said conveyer and discharge means at the opposite end thereof, power means carried by the conveyer for continuously moving weighable material from the location of the charging means toward the discharge means, and signal means including operating means therefor, said operating means being responsive to tilting movements of the conveyer but unaffected by bodily vertical movements of the conveyer, for operating the signal means upon tilting of the conveyer incident to inconsistencies in the feed of material advanced by the charging means.

7. The combination with a storage bin for bulk material of a dusty nature, and a distributing device, of a conveyer unit disposed between said storage bin and distributing device including means for weighing the material as it is conveyed to said distributing device, said weighing means comprising a horizontal closed conveyer including independent drive means, a scale, means for operatively suspending said horizontal conveyer from said scale, said horizontal conveyer having inlet and outlet ports disposed at opposite ends thereof, and flexible conduit means associated with the outlet port and the inlet port of said horizontal conveyer for guiding the contents of said storage bin to said horizontal conveyer, and for placing said outlet port in communication with said distributing device, the weight of material being conveyed through said horizontal conveyer at any instant being indicated on said scale, and means responsive to fluctuations in weight indicated upon the scale for controlling the quantitative measure of material fed from the bin to the horizontal conveyer.

8. In a conveyer unit for dusty bulk material, the combination of means for metering predetermined quantities of said material from said unit, said means comprising a horizontal tube form of conveyer, means for operating said conveyer at a uniform rate of speed, means for delivering material to said conveyer at a substantially constant rate, timer means for controlling the operating time periods of said last two mentioned means irrespective of the quantity of material moved through the horizontal conveyer, and means responsive to variations in the density of the material delivered to the conveyer by said delivering means, for altering the quantitative measure of material advanced by the delivering means.

9. The combination with a storage bin for bulk material and a distributing device, of a conveyer unit disposed between said storage bin and distributing device including means for weighing the material as it is conveyed to said distributing device, said weighing means comprising a horizontal conveyer including independent drive means, a scale, pivotal means for operatively suspending said horizontal conveyer bodily from said scale for bodily horizontal movement and tilting movement in a vertical plane, said horizontal conveyer having inlet and outlet ports disposed at opposite ends thereof, means extending between said storage bin and the inlet port of said horizontal conveyer for transferring the contents of said storage bin to said horizontal conveyer, said outlet port being in communication with said distributing device, the constancy of the weight of material being conveyed through said horizontal conveyer at any instant being indicated on said scale, means operated by the tilting movements of the horizontal conveyer for indicating unbalanced conditions of said conveyer, and means for regulating the feed of material from the bin to the inlet port of said conveyer to re-establish a balanced condition thereof.

10. Apparatus of the class described, comprising in combination a storage bin for bulk material, and a receiver for the material, a variable speed elevator associated with the storage bin for carrying the bulk material continuously to a level above the bin, said elevator including a downwardly opening delivery port, a weighing scale including a beam supported at an elevation corresponding substantially to the elevation of the elevator delivery port, a normally horizontal elongated cylindrical housing carrying a conveyer screw, and a motor for rotating said screw at a constant rate of speed, said housing including an upwardly directed port at one of its ends and a downwardly directed discharge port at its opposite end, said upwardly directed port being located beneath and spaced from the downwardly opening delivery port of the elevator, an expansible tubular collar connecting the delivery port to the adjacent upwardly directed port of the conveyer screw housing, a second expansible tubular collar connecting the downwardly directed discharge port of the housing with the receiver, pivot means bodily suspending the screw conveyer housing from the scale beam at a point intermediate the ends of said housing, for tilting movement of the housing and displacement of its opposed port ends toward and from the expansible collars, and means for controlling the material feed rate of the elevator.

11. Apparatus of the class described, comprising in combination a storage bin for bulk material, and a receiver for the material, a variable speed elevator associated with the storage bin for carrying the bulk material continuously to a level above the bin, said elevator including a downwardly opening delivery port, a weighing scale including a beam supported at an elevation corresponding substantially to the elevation of the elevator delivery port, a normally horizontal elongated cylindrical housing carrying a conveyer screw, and a motor for rotating said screw at a constant rate of speed, said housing including an upwardly directed port at one of its ends and a downwardly directed discharge port at its opposite end, said upwardly directed port being located beneath and spaced from the downwardly opening delivery port of the elevator, an expansible tubular collar connecting the delivery port to the adjacent upwardly directed port of the conveyer screw housing, a second expansible tubular collar connecting the downwardly directed discharge port of the housing with the receiver, pivot means bodily suspending the screw conveyer housing from the scale beam at a point intermediate the ends of said housing, for tilting movement of the housing and displacement of its opposed port ends toward and from the expansible collars, and means for controlling the material feed rate of the elevator, said controlling means including a by-pass arranged to divert a portion of the material advanced by the elevator and to return the diverted portion to the storage bin.

12. Apparatus of the class described, comprising in combination a storage bin for bulk material, and a receiver for the material, a variable speed elevator associated with the storage bin for carrying the bulk material continuously to a level above the bin, said elevator including a downwardly opening delivery port, a weighing scale including a beam supported at an elevation corresponding substantially to the elevation of the elevator delivery port, a normally horizontal elongated cylindrical housing carrying a conveyer screw, and a motor for rotating said screw at a constant rate of speed, said housing including an upwardly directed port at one of its ends and a downwardly directed discharge port at its opposite end, said upwardly directed port being located beneath and spaced from the downwardly opening delivery port of the elevator, an expansible tubular collar connecting the delivery port to the adjacent upwardly directed port of the conveyer screw housing, a second expansible tubular collar connecting the downwardly directed discharge port of the housing with the receiver, pivot means bodily suspending the screw conveyer housing from the scale beam at a point intermediate the ends of said housing, for tilting movement of the housing and displacement of its opposed port ends toward and from the expansible collars, electrical means including an electrical circuit, an electric switch in the circuit arranged upon the tiltable housing to respond to tilting movements of the housing for closing the electrical circuit, an electric alarm device connected in the circuit and energized upon closing of the switch and completion of the circuit, and means for altering the material feed rate of the elevator to re-establish a balanced condition of the tiltable housing and thereby actuate the switch to break the electrical circuit and de-energize the alarm device.

13. Apparatus of the class described, comprising in combination a storage bin for bulk material, and a receiver for the material, a variable speed elevator associated with the storage bin for carrying the bulk material continuously to a level above the bin, said elevator including a downwardly opening delivery port, a weighing scale including a beam supported at an elevation corresponding substantially to the elevation of the elevator delivery port, a normally horizontal elongated cylindrical housing carrying a conveyer screw, and a motor for rotating said screw at a constant rate of speed, said housing including an upwardly directed port at one of its ends and a downwardly directed discharge port at its opposite end, said upwardly directed port being located beneath and spaced from the downwardly opening delivery port of the elevator, an expansible tubular collar connecting the delivery port to the adjacent upwardly directed port of the conveyer screw housing, a second expansible tubular collar connecting the downwardly directed discharge port of the housing with the receiver, pivot means bodily suspending the screw conveyer housing from the scale beam at a point intermediate the ends of said housing, for tilting movement of the housing and displacement of its opposed port ends toward and from the expansible collars, and means for controlling the material feed rate of the elevator to ensure delivery of material to the receiver at a predetermined quantity per unit of time, and an horological means including a traveling pointer, a dial calibrated in units of weight and over which the pointer sweeps under the driving power of the horological means, a stepped cam movable with the pointer, a carriage pivoted adjacent to the cam and including a cam follower riding on the cam, and a circuit breaker on the carriage operative as the follower passes over the step of the cam, to de-energize the circuit of the motor and stop the apparatus.

14. An apparatus of the class described, comprising in combination a storage bin for bulk material, and a receiver for the material, an elevator associated with the storage bin for carrying a continuous stream of bulk material to a level above the bin, said elevator including a downwardly opening delivery port, a weighing scale including a beam supported at an elevation corresponding approximately to the elevation of said delivery port, a substantially horizontal elongated cylindrical housing and a driven conveyer screw in the housing rotating at a predetermined rate of speed, said housing including an upwardly directed port at one of its ends and a downwardly directed discharge port at its opposite end, said upwardly directed port being located beneath and spaced from the downwardly opening delivery port of the elevator, an expansible tubular collar connecting the delivery port to the adjacent upwardly directed port of the conveyer screw housing, a second expansible tubular collar connecting the downwardly directed discharge port of the housing with the receiver, and means bodily suspending the screw conveyer housing from the scale beam in a horizontal position whereby to maintain the various ports in registry as stated, irrespective of the beam movements.

15. An apparatus of the class described, comprising in combination a storage bin for bulk material, and a receiver for the material, an elevator associated with the storage bin for carrying a continuous stream of bulk material to a level above the bin, said elevator including a downwardly opening delivery port, a weighing scale including a beam supported at an elevation corresponding approximately to the elevation of said delivery port, a substantially horizontal elongated cylindrical housing and a driven conveyer screw in the housing rotating at a predetermined rate of speed, said housing including an upwardly directed port at one of its ends and a downwardly directed discharge port at its opposite end, said upwardly directed port being located beneath and spaced from the downwardly opening delivery port of the elevator, an expansible tubular collar connecting the delivery port to the adjacent upwardly directed port of the conveyer screw housing, a second expansible tubular collar connecting the downwardly directed discharge port of the housing with the receiver, means bodily suspending the screw conveyer housing from the scale beam in a horizontal position whereby to maintain the various ports in registry as stated, irrespective of the beam movements, and means maintaining a balanced condition of the beam by regulating the flow of material into the horizontal conveyer screw housing.

16. An apparatus of the class described, comprising in combination a storage bin for bulk material, and a receiver for the material, an elevator associated with the storage bin for carrying a continuous stream of bulk material to a level above the bin, said elevator including a downwardly opening delivery port, a weighing scale including a beam supported at an elevation corresponding approximately to the elevation of said delivery port, a substantially horizontal elongated cylindrical housing and a driven conveyer screw in the housing rotating at a predetermined rate of speed, said housing including an upwardly directed port at one of its ends and a downwardly directed discharge port at its opposite end, said upwardly directed port being located beneath and spaced from the downwardly opening delivery port of the elevator, an expansible tubular collar connecting the delivery port to the adjacent upwardly directed port of the conveyer screw housing, a second expansible tubular collar connecting the downwardly directed discharge port of the housing with the receiver, means bodily suspending the screw conveyer housing from the scale beam in a horizontal position whereby to maintain the various ports in registry as stated, irrespective of the beam movements, and means maintaining a balanced condition of the beam by regulating the flow of material into the horizontal conveyor screw housing, said means comprising a valve-controlled by-pass tube to divert a portion of the elevated material from the elevator to the storage bin.

17. An apparatus of the class described, comprising in combination a storage bin for bulk material, and a receiver for the material, an elevator associated with the storage bin for carrying a continuous stream of bulk material to a level above the bin, said elevator including a downwardly opening delivery port, a weighing scale including a beam supported at an elevation corresponding approximately to the elevation of said delivery port, a substantially horizontal elongated cylindrical housing and a driven conveyer screw in the housing rotating at a predetermined rate of speed, said housing including an upwardly directed port at one of its ends and a downwardly directed discharge port at its opposite end, said upwardly directed port being located beneath and spaced from the downwardly opening delivery port of the elevator, an expansible tubular collar connecting the delivery port to the adjacent upwardly directed port of the conveyer screw housing, a second expansible tubular collar connecting the downwardly directed discharge port of the housing with the receiver, means bodily suspending the screw conveyer housing from the scale beam in a horizontal position whereby to maintain the various ports in registry as stated, irrespective of the beam movements, and signal means including operating means therefor, said operating means being responsive to movements of the scale beam and the screw conveyer housing suspended therefrom, for operating the signal means incident to inconsistencies in the feed of material to the screw conveyer housing by said elevator.

18. An apparatus of the class described, comprising in combination a storage bin for bulk material, and a receiver for the material, an elevator associated with the storage bin for carrying a continuous stream of bulk material to a level above the bin, said elevator including a downwardly opening delivery port, a weighing scale including a beam supported at an elevation corresponding approximately to the elevation of said delivery port, a substantially horizontal elongated cylindrical housing and a driven conveyer screw in the housing rotating at a predetermined rate of speed, said housing including an upwardly directed port at one of its ends and a downwardly directed discharge port at its opposite end, said upwardly directed port being located beneath and spaced from the downwardly opening delivery port of the elevator, an expansible tubular collar connecting the delivery port to the adjacent upwardly directed port of the conveyer screw housing, a second expansible tubular collar connecting the downwardly directed discharge port of the housing with the receiver, means bodily suspending the screw conveyer housing from the scale beam in a horizontal position whereby to maintain the various ports in registry as stated, irrespective of the beam movements, and signal means including operating means therefor, said operating means being responsive to movements of the scale beam and the screw conveyer housing suspended therefrom, for operating the signal means incident to inconsistencies in the feed of material to the screw conveyer housing by said elevator, and means for regulating the flow of material from the elevator and into the screw conveyer housing, to maintain a balanced condition of the scale beam and a neutral condition of the signal operating means.

ERWIN S. MASON.